United States Patent
Kurple et al.

(10) Patent No.: US 11,136,716 B2
(45) Date of Patent: Oct. 5, 2021

(54) PROCESS FOR THE ISOLATION OF LIGNIN FROM BLACK LIQUOR AND MODIFICATION OF THE LIGNIN FOR PLASTIC APPLICATIONS

(71) Applicant: ORGANIC CHEMICAL LLC, Port Huron, MI (US)

(72) Inventors: Kurt Kurple, China, MI (US); Nathan Kurple, Casco, MI (US); Michael Kerman, Romeo, MI (US)

(73) Assignee: ORGANIC CHEMICAL LLC, Port Huron, MI (US)

( * ) Notice: Subject to any disclaimer, the term of this patent is extended or adjusted under 35 U.S.C. 154(b) by 119 days.

(21) Appl. No.: 16/665,608

(22) Filed: Oct. 28, 2019

(65) Prior Publication Data

US 2020/0063341 A1    Feb. 27, 2020

Related U.S. Application Data

(63) Continuation of application No. 14/816,859, filed on Aug. 3, 2015, now Pat. No. 10,458,066.

(60) Provisional application No. 62/032,510, filed on Aug. 1, 2014.

(51) Int. Cl.
*D21C 11/00* (2006.01)
*D21C 9/18* (2006.01)
*B01D 3/10* (2006.01)

(52) U.S. Cl.
CPC ........... *D21C 11/0007* (2013.01); *D21C 9/18* (2013.01); *D21C 11/0042* (2013.01); *D21C 11/0057* (2013.01); *B01D 3/10* (2013.01)

(58) Field of Classification Search
CPC ................................. D21C 11/0042
See application file for complete search history.

(56) References Cited

U.S. PATENT DOCUMENTS

| | | | | |
|---|---|---|---|---|
| 2,744,927 A * | 5/1956 | Copenhaver | ............ | C07C 53/08 562/513 |
| 3,233,656 A * | 2/1966 | Rodenacker | ........... | B01D 1/222 159/12 |
| 4,764,596 A * | 8/1988 | Lora | ..................... | C07D 307/50 162/16 |
| 4,966,650 A * | 10/1990 | DeLong | ................... | C08H 6/00 162/14 |
| 5,749,926 A * | 5/1998 | Dilling | ................ | B01F 17/0057 8/524 |
| 2005/0197490 A1 * | 9/2005 | Rojas | ..................... | C11B 13/005 530/205 |
| 2008/0317661 A1 * | 12/2008 | Eckert | ........................ | D01F 9/17 423/447.4 |
| 2012/0202907 A1 * | 8/2012 | Kurple | ............... | C08G 18/7664 521/170 |
| 2015/0183813 A1 * | 7/2015 | Eskelinen | ................ | C08H 6/00 530/507 |

* cited by examiner

*Primary Examiner* — Anthony Calandra
(74) *Attorney, Agent, or Firm* — Woodling, Krost and Rust

(57) ABSTRACT

A process for the isolation of lignin from black liquor and modification of lignin for use in many plastic applications is disclosed. The isolation of lignin consists of removing all of the non-lignin components from black liquor solution. The non-lignin components including but not limited to organic acids, sugars, and inorganic materials can be removed using either solvent extraction or ion-exchange resin or a combination of both methods. The isolated lignin is water soluble. The non-lignin components can be further isolated and sold or reused in the pulping or lignin isolation processes. The isolated lignin can be further modified in order to meet the needs of the desired plastic application.

4 Claims, No Drawings

PROCESS FOR THE ISOLATION OF LIGNIN FROM BLACK LIQUOR AND MODIFICATION OF THE LIGNIN FOR PLASTIC APPLICATIONS

This application claims priority to, and the benefit of, U.S. Non-Provisional application Ser. No. 14/816,859 filed Aug. 3, 2015 which claims priority to, and the benefit of U.S. Provisional Application Ser. No. 62/032,510 filed Aug. 1, 2014.

U.S. Non-Provisional application Ser. No. 14/816,859 filed Aug. 3, 2015 and U.S. Provisional Application Ser. No. 62/032,510 filed Aug. 1, 2014 are incorporated herein by reference hereto.

BACKGROUND OF THE INVENTION

Over 3 trillion pounds of plastic are consumed annually. Since most plastics are based on petrochemical products, the cost of plastic is very dependent on the cost of oil. So, as the cost of oil increases, the cost of the plastic will also increase.

Recently, carbon neutral plastics have become popular. These plastics are based on the use of agricultural feedstocks. The use of agricultural feedstocks does reduce dependence on petroleum; however its cost is impacted by the price of food. Furthermore, plastics produced from agricultural feedstocks are technically carbon-neutral, they still require large amounts of fuel to produce, and are affected by the volatility of global food markets.

Lignin is a natural phenolic type molecule found in wood, straw, corn stover, sugar cane, and virtually all other plants. Lignin is a byproduct of the paper pulping process and cellulosic ethanol production. The waste byproduct of the pulp and paper industry is called black liquor which contains lignin, sugars, organic acids, and inorganic chemicals. Lignin in the black liquor waste stream is primarily burned to recover its heat value and inorganic chemicals. In the United States alone over 50 billion pounds of lignin are burned annually, and over 100 billion lbs are burned throughout the world. Lignin can be used to meet the various applications of the plastics industry without the cost or environmental concerns associated with plastics produced from petroleum or agricultural feedstocks.

To meet the needs of the global plastic industry, lignin must be both extracted from the black liquor waste stream in a cost effective process and the extracted lignin must be compatible with plastic applications. The inventors believe existing lignin extraction methods are not cost effective and the extracted lignin is not compatible with most plastic applications.

The primary method of lignin extraction from black liquor consists of pH reduction until lignin precipitates from the aqueous solution. Black liquor has a pH ranging from 10-14 depending on the pulping process and concentration. Lignin will precipitate from the black liquor solution when the pH is reduced to 1-3. Typically, strong acids such as sulfuric or hydrochloric acid are used to reduce the pH.

The pH reduction causes the extracted lignin to contain significant amounts of inorganic ions. The pulping process and a mineral acid used to reduce the pH contribute to the inorganic ions in lignin. Inorganic ions can partially or completely inhibit reactions necessary to make lignin based plastic. The inorganic ions can be removed using different washing methods. One washing method consists of using a solution of water and an organic acid such as acetic acid. The organic acid solution helps remove inorganic ions from the precipitated lignin, but also increases lignin cost.

The pH reduction fundamentally changes the shape of the lignin molecule. The lignin molecule becomes spherical which causes the functional groups and reactive sites to no longer be accessible. As a result, extracted lignin becomes insoluble in water and many solvents, and is not compatible with many plastic applications.

In addition, pH reduction also causes the lignin molecules to react with each other creating lignin molecules of larger molecular weight. When lignin with large molecular weight is used in plastic applications, then the viscosity will significantly increase. The viscosity increase is undesirable for plastic manufacturing.

Additional processing is needed to compensate for inorganic ions, spherical shape, and larger molecular weight associated with lignin produced by pH reduction. The additional processing requires significant amounts of energy, reagents, and processing. As a result lignin extracted using pH reduction methods is not cost effective and cannot be used in many plastic applications.

The isolated lignin may be dried to remove all water creating an isolated lignin solid. Standard water removal processes are used including but not limited to: vacuum distillation, falling film evaporation, rotary evaporation, reverse osmosis, or oven drying.

SUMMARY OF THE INVENTION

It has been discovered that lignin can be separated from black liquor in a cost effective process which enables lignin to be compatible in many plastic applications. This process focuses first on isolating lignin from all of the non-lignin chemical components of black liquor, leaving behind an isolated form of lignin which is soluble in water. In addition, all of the non-lignin chemical components of black liquor can be isolated from one another. The non-lignin chemical components include but are not limited to organic acids, sugars, and inorganic materials. The non-lignin chemical components can be sold or reused in other processes. The second stage of the process is modifying the isolated water soluble lignin for use in plastic applications. Many different methods can be used to modify lignin.

The paper and cellulosic ethanol industries use many different processes for separating cellulose from lignin. The processes can use many different types of biomass including but not limited to woody plants, switch grass, and corn stover. The process could be but is not limited to Kraft, solvent, mechanical, semi-mechanical, sulfate, sulfite, soda, or enzymatic pulping processes. In addition some of the processes produce a lignin powder rather than black liquor. The lignin powder can be further isolated and modified using this process. First the lignin powder must be dissolved in water. Lignin powder can be dissolved in water using sodium hydroxide solution or solvents. The resulting lignin solution is effectively black liquor, and can be further isolated and modified in the same manner as black liquor.

Removing the non-lignin chemical components can be achieved through different methods. One method is solvent separation and the other method is ion exchange. The solvent separation method and the ion exchange methods can be used independently or in combination to isolate lignin.

The solvent separation method consists of adding a solvent to black liquor. The solvent enables lignin to be separated from the other components in black liquor. If the black liquor solvent solution is filtered, lignin will be retained by the filter and the solvent, water, organic acids, sugars, and inorganic materials will permeate the filter.

Similarly, if centrifuged, lignin will separate from the solvent, water, organic acids, sugars, and inorganic materials. If any organic acids, sugars, and inorganic materials remain in the lignin, then isolated lignin can be dissolved in a solvent water solution and separated either through filtering or centrifugation as many times as needed until all unwanted materials are removed. The isolated lignin can be dried to remove any residual solvent or water creating a solid isolated lignin, or the isolated lignin can be further diluted to create an isolated lignin aqueous solution.

Another method to remove the non-lignin components of black liquor consists of using an ion exchange resin. The black liquor solution must be sufficiently dilute to easily flow over ion exchange resin. Different types of ion exchange resins need to be used in order to extract the non-lignin chemical components from black liquor. One type of ion exchange resin will be needed to extract the anions. Another type of ion exchange resin will be needed to extract the cations. A third type will be needed to extract the sugars. After the black liquor solution is exposed to all of the ion exchange resin, an aqueous solution of isolated lignin will be produced. The aqueous lignin solution will be free of organic acids, sugar, and inorganic ions. The isolated lignin can be modified in its aqueous form, or the water can be removed using vacuum distillation, flash film distillation, oven drying, or spray drying which will create a solid isolated lignin.

Both methods for isolating lignin allow the non-lignin components of black liquor to be isolated. After non-lignin chemical components are isolated from each other, the components can be reused or sold as commodity chemicals. The solvent can be reused for further solvent separations. The sugars and organic acids can be sold as commodity chemicals. The inorganic ions can be reused in the pulping process.

The non-lignin solution from solvent separation contains organic acid, sugars and inorganic ions. The solvent can be recovered via vacuum distillation. When the pH of the non-lignin solution is reduced, the organic acids will no longer remain soluble and can be removed from the remaining solution using filtration or centrifugation. The sugars can be removed from the solution by a secondary solvent extraction. The solvent will create two phases. One phase will be the solvent which contain the sugars, and the other phase will contain water and inorganic material. The phases can be separated by centrifugation. The sugars can be separated from the solvent by vacuum distillation of the solvent which will leave solid sugar crystals. Finally, the inorganic ions can be separated from the water phase by a process including but not limited to reverse osmosis and vacuum distillation.

During the ion exchange process, all of the non-lignin chemical components will be retained by the ion exchange resin. When the ion exchange resin is regenerated, the non-lignin components will be removed from the resin, and become part of the regenerate waste stream. The regenerate waste stream from the anion removal resin can contain sugars, organic acids, and inorganic ions from black liquor and the conjugate ion from the regenerate chemical. The organic acids will precipitate from the solution when the pH is reduced, and can be separated by filtration or centrifugation. The sugars can be removed using solvent extraction. The ion organic ions can be removed by distillation for filtration. The regenerate stream from the cation removal resin can contain inorganic ions from black liquor and the conjugate ion from the regenerate chemical. The ion organic ions can be removed by distillation or filtration.

The isolated lignin can be modified to meet the requirements of many plastic applications. The desired application for lignin based plastic will determine the modification process. The modification to lignin could include but not limited to: oxidation, reduction, hydrogenation, dehydrogenation, hydrolysis, hydration, dehydration, halogenation, nitrification, sulfonation, ammoniation, alkaline fusion, alkylation, dealkylation, esterification, etherification, polymerization, polycondensation, epoxidation, propoxylation, ethoxylation, amidization, and alkoxylation. The modification process could include but are not limited to: size separation, chromatography, ion exchange, reaction with other chemicals, and blending with other chemicals.

The isolated lignin can have a large spectrum of sizes and reactive groups as a result of the process which separated lignin from cellulose. Depending on the plastic application, a specific range of lignin sizes may be needed. To achieve the specific size, the isolated lignin can be dissolved in solvent and using size exclusion filtration, lignin can be sorted into different sizes.

To achieve lignin with specific reactive groups, the lignin can be separated using various process including but not limited to chromatography, electrophoresis, and centrifugation. The resultant lignin with consistent size and functional groups can be used as a reactive nanoparticle.

The isolated lignin can be reacted with organic acids including but not limited to: formic acid, acetic acid, stearic acid, ricinoleic acid, oleic, linoleic and caprylic acid to produce lignin organic acid esters of various structures. Reaction of lignin with a saturated organic acid such as stearic acid will result in a thermoplastic. Reaction with unsaturated organic acids will result in an alkene polymerization which can be used as a thermoset plastic. The isolated lignin can be reacted with amines including by not limited to: diglycol amine, 2-(2-aminoethoxy) ethanol, dimethylethyl amine, and dimethanol amine to modify the function groups on the isolated lignin molecule. The isolated lignin can be reacted with sugars and alcohols including but not limited to: glycerol, triglycerol, sorbitol which will also modify the structure and functional groups of the lignin molecule. The lignin molecule can be modified using ion exchange resins which can condense or esterify the lignin molecule. The isolated and/or modified lignin can be blended with existing plastic resins either from agricultural or petroleum feedstocks to produce a lignin/agricultural/petroleum hybrid plastic resin.

DESCRIPTION OF THE INVENTION

Example 1—An Example of Lignin Isolated Using Solvent Separation and Filter

To isolate lignin from black liquor perform the following steps. The ratio of lignin to acetone and water to acetone is critical to performing the separation. If the ratio of lignin to acetone is too large or the ratio of water to acetone is too small, then acetone will create a separate phase not blended with black liquor. If the ratio of lignin to acetone is too small or the ratio of water to acetone is too large, then lignin will not separate from black liquor. In this example the ratio of lignin to acetone was found suitable at 1:6. In this example the ratio of water to acetone was found suitable 1:1.8. In a suitable vessel blend 100 parts black liquor (where the black liquor contains 25 parts lignin, 20 parts inorganics, and 5 parts sugars and organic acids), 125 parts water, and 300 parts acetone. Those skilled in the art will recognize that as used herein that "vessel" encompasses an industrial process and that ratios and relationships stated herein apply to industrial processes. Blend the solution until it is homogenous in color. Filter the black liquor solvent solution using standard cellulose filter and vacuum vessel. Lignin, water, and trace amounts of acetone, sugars, inorganic material, and organic acids will be retained by the filter and the majority of the water, acetone, sugars, inorganic, and organic acids will permeate the filter. The filter retentate is approximately 50% isolated lignin, 49% water, and trace amounts of sugars, organic acids, and inorganic material. The retained lignin can be blended with water and acetone and filtered as many times as need to remove the trace amounts of sugars, organic acids, and inorganic material. The product of this example is an isolated lignin and water solution which has approximately 50% lignin content, has a mud like consistency, and is dark brown in color.

Example 2—An Example of Lignin Isolated Using Solvent Separation and Centrifuge

To isolate lignin from black liquor perform the following steps. The ratio of lignin to acetone and water to acetone is critical to performing the separation. Lignin to water and lignin to acetone ratios must be the same as specified in Example 1. In a suitable vessel blend 100 parts black liquor (where the black liquor contains 20-25 parts lignin, 20-25 parts inorganics, and 3-8 parts sugars and organic acids), 125 parts water, and 300 parts acetone. Blend the solution until it is homogenous in color. Centrifuge the solution. Lignin, water, and trace amounts of acetone, sugars, inorganic material, and organic acids will be collect in the bowl of the centrifuge. The majority of the water, acetone, sugars, inorganic, and organic acids will exit the low density port of the centrifuge. The material retained in centrifuge bowel is approximately 90% isolated lignin, 9% water, and 1% trace amounts of sugars, organic acids, and inorganic material. The retained lignin can be blended with water and acetone and centrifuged as many times as need to remove the trace amounts of sugars, organic acids, and inorganic material. The product of this example is an isolated lignin solid which has approximately 90% lignin content and is dark brown in color.

Example 3—An Example of Lignin Isolated Using Ion Exchange Resin

To isolate lignin from black liquor perform the following steps. Black liquor must easily flow through the ion exchange beads. The lignin solid content is reduced using water. In a suitable vessel blend 100 parts black liquor (where the black liquor contains approximately 20-25 parts lignin, approximately 20-25 parts inorganics, and approximately 3-8 parts sugars and organic acids) and approximately 150 parts water. The diluted black liquor solution had an initial pH of approximately 9.5-10.5. Blend the solution until it is homogenous in color. Pour the solution into a chromatography column which contains Dow Amberlyst A26 OH resin, an anionic macroreticular polymeric resin based on cross linked styrene divinylbezene copolymer containing quaternary ammonium groups. The black liquor will flow thru the column. The resin will retain all negatively charged ions and replace the ion with a hydroxyl group. After being exposed to the ion exchange resin black liquor solution will have a pH of approximately 13.0-14.0, and the solution will be noticeably darker than the original solution. The next step is to pour the anion-free black liquor solution into a chromatography column which contains Dow Amberlite IR 120H resin, cation exchange resin of the sulfonated polystyrene type. The resin will retain all positively charged particles. The resin will retain all positively charged ions and replace the ion with a hydrogen ion. After being exposed to the ion exchange resin black liquor solution will have a pH of approximately 1.0-2.0, and the solution will be noticeably lighter brown than the original solution. After the removal of the anions and cations the lignin will be isolated in the solution. The product of this example is an isolated lignin solution which has approximately 5% lignin content, has a watery consistency and is dark brown in color.

Example 4—An Example of Lignin Isolated Using Solvent Separation and Ion Exchange Resin To isolate lignin from black liquor perform the following steps. Isolate lignin using the process described in Example 1 or Example 2. In a suitable vessel, blend the product of Example 1 or Example 2 with water until approximately 5% lignin content is achieved. The isolated lignin solution will an initial pH of approximately 9.5-10.5. Pour the solution into a chromatography column which contains Dow Amberlyst A26 OH resin, an anionic macroreticular polymeric resin based on cross linked styrene divinylbezene copolymer containing quaternary ammonium groups. The solution will flow thru the column. The resin will retain all negatively charged ions and replace the ion with a hydroxyl group. After being exposed to the ion exchange resin the solution will have a pH of approximately 13.0-14.0, and the anion free solution will be noticeably darker than the original solution. The next step is to pour the anion-free solution into a chromatography column which contains Dow Amberlite IR 120H resin, cation exchange resin of the sulfonated polystyrene type. The resin will retain all positively charged ions and replace the ion with a hydrogen ion. After being exposed to the ion exchange resin the solution will have a pH of approximately 1.0-2.0, and the solution will be noticeably lighter brown than the original solution. After the removal of the anions and cations the lignin will be isolated in the solution. The product of this example is an isolated lignin solution which has approximately 5% lignin content, has a watery consistency and is dark brown in color.

Example 5—An Example of Excess Water Removal from Isolated Lignin Solution Using Vacuum Vessel To remove excess water from isolated lignin solution, perform the following steps. Using the isolated lignin solution from Example 3 or Example 4, place the solution in a suitable vessel with temperature control, mixing and vacuum. While mixing the solution, heat the vessel to approximately 180° F. and apply vacuum. After sufficient water has been removed so as to increase the lignin the percentage to approximately 50%, remove the lignin solution from the vessel. The product of this example is an isolated lignin and water solution which has approximately 50% lignin content, has a mud like consistency, and is dark brown in color.

Example 6—An Example of Excess Water Removal from Isolated Lignin Solution Using Rotary Evaporator To remove excess water from an isolated lignin solution, perform the following steps. Using the isolated lignin solution from Example 3 or Example 4, place the solution in a rotary evaporator vessel. Install the rotary evaporator, and begin rotation, apply vacuum and heat to approximately 180° F. After sufficient water has been removed so as to increase the lignin the percentage to approximately 50%, remove the lignin solution from the vessel. The product of this example is an isolated lignin and water solution which has approximately 50% lignin content, has a mud like consistency, and is dark brown in color.

Example 7—An Example of Complete Water Removal from Isolated Lignin Solution To remove all water from an isolated lignin, perform the following steps. Using the isolated lignin solution from Example 1, Example 2, Example 5, and Example 6, place the solution in a drying oven. Heat the oven to approximately 180° F. Vacuum can be applied to increase the rate of water removal, if desired. After all water is evaporated the isolated lignin solid can be removed. The product of this example is an isolated lignin solid which contains no water and is dark brown in color.

Example 8—An Example of Lignin Modification with Amines

To modify an isolated lignin with amines, perform the following steps. The process can be performed using an isolated lignin solution. The isolated lignin solution can be mixed with an amine such as Huntsman DIGLYCOLAMINE® Agent/DGA®, 2-(2-aminoethoxy) ethanol. In this example the ratio of DGA to isolated lignin was found suitable at approximately 1:5 parts. The resultant isolated and modified lignin solution will have a higher pH. Using the isolated lignin solution from Example 4, which contains approximately 40 parts isolated lignin, is mixed with approximately 10 parts of DGA. The pH of the solution prior to the addition of DGA was approximately 1.4. After the addition and blending of the isolated lignin solution and DGA, the pH rose to approximately 7.3. The product of this example is an isolated and modified lignin solution.

Example 9—An Example of Isolated Lignin Solution Modification with Saturated Organic Acids To modify an isolated lignin with saturated organic acid, perform the following steps. Place approximately 2000 parts of isolated lignin solution (5% isolated lignin and 95% water) in a suitable vessel with temperature control, mixing and vacuum. While mixing the solution, heat the vessel to approximately 180° F. After temperature has been achieved, add approximately 100 parts stearic acid. Continue mixing, heating and apply vacuum. After all water is removed, then remove the lignin stearic acid from the vessel. The product of this example is a thermoplastic consisting of lignin and organic acid. The ratio of isolated lignin solid and stearic acid can be adjusted as needed to meet the desired properties of the thermoplastic.

Example 10—An Example of Isolated Lignin Solution Modification with Unsaturated Organic Acids To modify an isolated lignin with an unsaturated organic acid, perform the following steps. Place approximately 2000 parts of isolated lignin solution (5% isolated lignin and 95% water) in a suitable vessel with temperature control, mixing and vacuum. While mixing the solution, heat the vessel to approximately 180° F. After temperature has been achieved, add approximately 100 parts oleic acid. Continue mixing, heating and apply vacuum. After all water is removed remove the lignin oleic acid material from the vessel. The product of this example is a thermoset consisting of lignin and an unsaturated organic acid. The ratio of isolated lignin solid and oleic acid can be adjusted as needed to meet the desired properties of the thermoplastic.

Example 11—An Example of Isolated Lignin Solution Modification with Organic Acids with a Hydroxyl Group To modify an isolated lignin with an organic acid with a hydroxyl group, perform the following steps. Place approximately 2000 parts of isolated lignin solution (5% isolated lignin and 95% water) in a suitable vessel with temperature control, mixing and vacuum. While mixing the solution, heat the vessel to approximately 180° F. After temperature has been achieved, add approximately 150 parts ricinoleic acid. Continue mixing, heating and apply vacuum. After all water is removed remove the lignin ricinoleic acid material from the vessel. The product of this example is a lignin resin which can be used in polyurethane applications. The ratio of isolated lignin solution and ricinoleic acid can be adjusted as needed to meet the desired properties of the resin.

Example 12—An Example of Isolated Lignin Solution Modification with Glycerol To modify an isolated lignin with glycerol, perform the following steps. Place approximately 2000 parts of isolated lignin solution (5% isolated lignin and 95% water) in a suitable vessel with temperature control, mixing and vacuum. While mixing the solution, heat the vessel to approximately 180° F. After temperature has been achieved, add approximately 150 parts glycerol. Continue mixing, heating and apply vacuum. After all water is removed remove the material from the vessel. The product of this example is a lignin resin which can be used in polyurethane applications. The ratio of isolated lignin solution and glycerol can be adjusted as needed to meet the desired properties of the resin.

Example 13—An Example of Isolated Lignin Solution Modification with Conventional Polyols To modify an isolated lignin with a conventional polyol, perform the following steps. Place approximately 2000 parts of isolated lignin solution (5% isolated lignin and 95% water) in a suitable vessel with temperature control, mixing and vacuum. While mixing the solution, heat the vessel to approximately 180° F. After temperature has been achieved, add approximately 100 parts Huntsman JEFFOX WL-590, a polyether polyol. Continue mixing, heating and apply vacuum. After all water is removed remove the material from the vessel. The product of this example is a polyol which can be used in polyurethane applications. The ratio of isolated lignin solution and JEFFOX WL-590 can be adjusted as needed to meet the desired properties of the polyol.

Example 14—An Example of Isolated Lignin Solution Modification with Soy Based Polyols To modify an isolated lignin with a soy based polyol, perform the following steps. Place approximately 2000 parts of isolated lignin solution (5% isolated lignin and 95% water) in a suitable vessel with temperature control, mixing and vacuum. While mixing the solution, heat the vessel to approximately 180° F. After temperature has been achieved, add approximately 100 parts Biobased Agrol 2.0, hydroxylated soybean oil. Continue mixing, heating and apply vacuum. After all water is removed remove the material from the vessel. The product of this example is a polyol which can be used in polyurethane applications. The ratio of isolated lignin solid and Biobased Agrol 2.0 can be adjusted as needed to meet the desired properties of the polyol.

Example 15—An Example of Isolated Lignin Solid Modification with Saturated Organic Acids To modify an isolated lignin solid with saturated organic acid, perform the following steps. In a suitable vessel, add approximately 50 parts of stearic acid and approximately 50 parts of isolated lignin solid. Adequately agitate the materials while heating to approximately 180° F. After the mixture is homogenous, then pour the mixture on to a surface which allows this mixture to cool and form a hard solid material. The product of this example is a thermoplastic consisting of lignin and saturated organic acid. The ratio of isolated lignin solid and saturated organic acid can be adjusted as needed to meet the desired properties of the thermoplastic.

Example 16—An Example of Isolated Lignin Solid Modification with Unsaturated Organic Acids To modify an isolated lignin solid with unsaturated organic acid, perform the following steps. In a suitable vessel, add approximately 50 parts of oleic acid and approximately 50 parts of isolated lignin solid. Adequately agitate the materials while heating to approximately 180° F. After the mixture is homogenous, then pour the mixture on to a surface which allows this mixture to cool and form a hard solid material. The product of this example is a thermoset plastic consisting of lignin and unsaturated organic acid. The ratio of isolated lignin solid and unsaturated acid can be adjusted as needed to meet the desired properties of the thermoset plastic.

Example 17—An Example of Isolated Lignin Solid Modification with Organic Acids with a Hydroxyl Group To modify an isolated lignin solid with an organic acid with a hydroxyl group, perform the following steps. In a suitable vessel, add approximately 60 parts of ricinoleic acid and approximately 40 parts of isolated lignin solid. Adequately agitate the materials while heating to approximately 180° F. After the mixture is homogenous, then remove the lignin ricinoleic material from the vessel. The product of this example is a resin consisting of lignin and an organic acid with hydroxyl group. The ratio of isolated lignin solid and organic acid with hydroxyl group can be adjusted as needed to meet the desired properties of the resin.

Example 18—An Example of Isolated Lignin Solid Modification with Glycerol

To modify an isolated lignin solid with glycerol, perform the following steps. In a suitable vessel, add approximately 50 parts of glycerol and approximately 50 parts of isolated lignin solid. Adequately agitate the materials while heating to approximately 180° F. After the mixture is homogenous, then remove the lignin glycerol material from the vessel. The product of this example is a resin consisting of lignin and glycerol. The ratio of isolated lignin solid and glycerol can be adjusted as needed to meet the desired properties of the resin.

Example 19—An Example of Isolated Lignin Solid Modification with Conventional Polyols To modify an isolated lignin solid with a conventional polyol, perform the following steps. In a suitable vessel, add approximately 50 parts of Huntsman JEFFOX WL-590, a polyether polyol and approximately 50 parts of isolated lignin solid. Adequately agitate the materials while heating to approximately 180° F. After the mixture is homogenous, then remove the lignin conventional polyol material from the vessel. The product of this example is a resin consisting of lignin and conventional polyol. The ratio of isolated lignin solid and conventional polyol can be adjusted as needed to meet the desired properties of the resultant polyol.

Example 20—An Example of Isolated Lignin Solid Modification with Soy Based Polyols To modify an isolated lignin solid with a soy based polyol, perform the following steps. In a suitable vessel, add approximately 50 parts of Biobased Agrol 2.0 and approximately 50 parts of isolated lignin solid. Adequately agitate the materials while heating to approximately 180° F. After the mixture is homogenous, then remove the lignin soy based polyol material from the vessel. The product of this example is a resin consisting of lignin and soy based polyol. The ratio of isolated lignin solid and soy based polyol can be adjusted as needed to meet the desired properties of the resultant polyol.

What is claimed is:

1. A process for removing organic acids from black liquor containing lignin and non-lignin components, said lignin is not precipitated by lowering pH or acidification, comprising the steps of: adding a polar aprotic solvent to said black liquor containing lignin and non-lignin components forming a polar aprotic solvent and black liquor mixture;
   centrifuging said mixture containing lignin and non-lignin components, said lignin is retained in the bowl of the centrifuge;
   said non-lignin components and said polar aprotic solvent exit the bowl of the centrifuge forming a second mixture; reducing the pH of the said second mixture; and,
   filtering or centrifuging the second mixture, thereby removing organic acids from the other components of the second mixture.

2. The process of claim 1 wherein said black liquor is a product or byproduct stream of biomass processing selected from the group consisting of the Kraft paper pulping process and the sulfite paper pulping process.

3. The process of claim 1 wherein said non-lignin components are selected from the group consisting of sodium, potassium, calcium, sulfur, sulfates, sulfites, hydroxide, carbonate, bicarbonate, organic acids, resinous acids, sugars, sacharrides, polysacharrides, formic acid, acetic acid, methanol, ethanol, and combinations thereof.

4. The process of claim 1 wherein said polar aprotic solvent is selected from the group consisting of acetone, propylene carbonate, methylethylketone, and combinations thereof.

* * * * *